Figure 1:
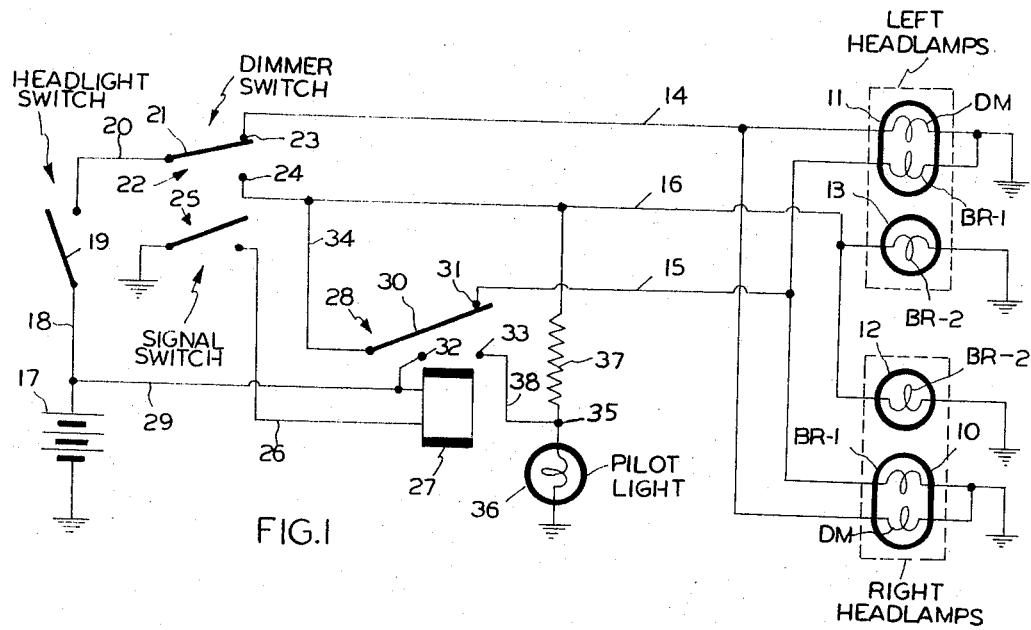

Feb. 21, 1967  E. E. LATE  3,305,695

VEHICLE HEADLIGHT SIGNAL SYSTEM

Filed July 31, 1964

*INVENTOR*
ERIC E. LATE

BY  *Robert D. Sommer*

AGENT

United States Patent Office 3,305,695
Patented Feb. 21, 1967

3,305,695
VEHICLE HEADLIGHT SIGNAL SYSTEM
Eric E. Late, Fond du Lac, Wis., assignor to Essex Wire Corporation, Fort Wayne, Ind., a corporation of Michigan
Filed July 31, 1964, Ser. No. 386,680
5 Claims. (Cl. 315—82)

This invention relates generally to vehicle headlight systems and more particularly to a vehicle signal system utilizing the usual multi-filament head lamps as signal lamps.

Motor vehicles for highway use are conventionally equipped with a four headlamp lighting system utilizing a pair of spaced twin headlight assemblies. Each headlight assembly includes an inner headlamp having a high beam filament and an outer headlamp having a high beam filament and a low beam filament. The four high beam filaments are simultaneously energized to provide a bright light for country driving. The two low beam filaments provide a relatively low intensity light for city driving and for overtaking a vehicle or passing an approaching vehicle. The usual practice is to provide a foot operated ratchet switch to alternately energize the high beam or the low beam filaments. In addition there is provided a manually operated headlight control switch which must be turned on to energize either of the high beam or the low beam filaments.

In night time driving it is common practice to alternately energize the high beam and the low beam filaments for signalling purposes. Such optical signals are used to indicate an intention to pass a vehicle or to remind the operator of an approaching vehicle that his high beam headlights are on. At night time vehicle operators frequently flash the headlights instead of operating the vehicle horn to give a warning signal to pedestrians and the operators of other vehicles.

Although it is obviously desirable to use the vehicle headlamps for signalling purposes, the alternate energization of the high beam and the low beam headlamps is hazardous under certain conditions. The sudden change from low beam intensity to high beam intensity tends to blind the operators of on-coming vehicles. On the other hand, the sudden change from high beam intensity to low beam intensity materially reduces the driver's visual acuity during the appreciable time required for the driver's eyes to adjust to this change. It would also be advantageous to use the vehicle headlamps for signalling purposes during day time driving either in conjunction with or independently of the vehicle horn. However, this is generally impractical in view of the manual movement required to first turn on the headlight control switch.

It is an object of this invention therefore, to provide an improved vehicle signal system in which the vehicle headlamp filaments may be selectively energized and de-energized to provide an optical signal regardless of the position of the headlight control switch and the beam selector switch.

Another object of this invention is to provide a vehicle headlight signal system in which the high beam indicator pilot light is utilized to indicate operation of the signal system.

In accordance with the invention, there is provided a headlight signal system for use in a vehicle four headlamp lighting system having a pair of outer lamps each including a low beam filament and a first high beam filament and a pair of inner lamps each including a second high beam filament. The low beam filaments are connected in parallel in a low beam circuit, the first high beam filaments are connected in parallel in a first high beam circuit and the second high beam filaments are connected in parallel in a second high beam circuit. These circuits are connected to the vehicle power source by the usual headlight on-off control switch and a dimmer or beam selecting switch which may be either manually operated or electrically operated by automatic light sensing apparatus which alternately energizes the low beam circuit and the two high beam circuits. The headlight signal system includes a normally closed switch means connected in circuit between the second high beam circuit and the dimmer switch. Other normally open switch means directly connect one of the high beam circuits to the power source. These normally closed and normally open switch means are operated by relay means connected to the power source by a normally open signal switch. When the relay means is energized upon closing of the signal switch by the vehicle operator, the relay switch means establish a circuit to one of the high beam circuits if the high beam filaments are not energized and interrupts the energizing circuit of one high beam circuit if the high beam circuits are energized. Thus the circuit of this invention utilized a single pair of high beam lamp filaments to provide an optical signal during either day time or night time operation of a vehicle.

Figure 2:
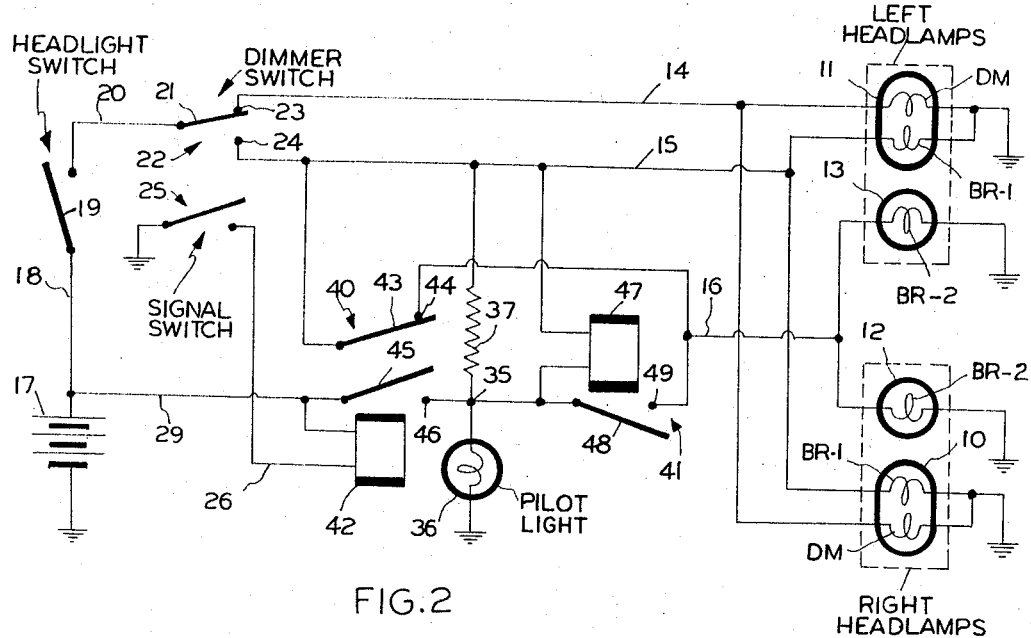

A feature of the invention is that the usual high beam indicator pilot light may be used to serve the additional function of indicating signal operation of the headlamps. The pilot light circuit is provided with a voltage dropping resistor for dimming the intensity of the pilot light for indicating normal operation of the high beam lamp filaments. The dimming resistor is shorted out by relay switch means upon operation of the signal switch. Thus when an optical signal is given the pilot light glows with maximum intensity to attract the attention of the vehicle operator even during the day time. These and other features of the invention will be more fully understood from the following description read in connection with the accompanying drawing, in which:

FIGURE 1 is an electrical schematic diagram of an embodiment of the invention; and FIGURE 2 is an electrical schematic diagram of a second embodiment of the invention.

Referring now more particularly to FIGURE 1 of the drawing there is shown therein a four headlamp lighting system having outer right and left lamps 10 and 11 and inner right and left lamps 12 and 13. Each of the outer lamps 10 and 11 contain a low beam filament DM and a high beam filament BR–1. Each of the inner lamps 12 and 13 has a high beam filament BR–2. One terminal of each of these lamp filaments is grounded. The two low beam filaments DM are connected in parallel to the low beam circuit conductor 14, the two high beam filaments BR–1 are connected in parallel to a first high beam circuit conductor 15 and the two high beam filaments BR–2 are connected in parallel to a second high beam circuit conductor 16.

The headlamp filaments are energized from a suitable power source such as the vehicle storage battery 17. The battery 17 has one terminal grounded and the other terminal connected through the conductor 18 to one terminal of a conventional headlight control switch 19. The other terminal of the headlight switch 19 is connected by conductor 20 to the movable contact 21 of a dimmer switch 22. The dimmer switch 22 may be either foot operated or electrically operated by well known automatic light sensing apparatus. Usually the switch 22 is a ratchet type of switch in which the movable contact 21 alternately engages the stationary contacts 23 and 24 and remains in its last actuated position until moved to the opposite contact. The stationary contacts 23 and 24 are connected to the low beam circuit conductor 14 and the second high beam circuit conductor 16 respectively.

For the purpose of controlling the vehicle headlamp in accordance with this invention there is provided a manually operated signal switch 25 having normally open contacts. While this switch may be separate from the dimmer switch 22 it is preferable that the switches be interconnected for selective actuation by a single operating mechanism. One example of the type of combined mechanism that could be utilized for the switches 19 and 25 is shown in the United States patent of Arnold A. Bluemle, 2,298,782 issued October 13, 1942. Obviously, other combination switches of well known construction providing independent actuation the push-to-close switch 25 and the usual ratchet switch 22 may be utilized. One terminal of the normally open signal switch 25 is grounded and the other terminal is connected by the conductor 26 to one terminal of the operating coil 27 of the relay 28. The other terminal of the coil 27 is connected to the battery 17 by conductor 29. The relay 28 includes an armature 30 normally engaging a stationary contact 31 and movable to bridge stationary contacts 32 and 33 when the coil 27 is energized. The armature 30 is connected by a conductor 34 to the contact 24 of the dimmer switch 22 and the second high beam circuit conductor 16. The contact 31 is connected to the first high beam circuit conductor 15 and the contact 32 is connected to the battery 17 by the conductor 29. The contact 33 is connected by a conductor 38 to the junction 35 of a high beam indicating pilot light 36 and a dimming resistor 37 connected in a series circuit which extends from ground to the contact 24 of the dimmer switch 22.

The operation of the circuit of FIGURE 1 will now be described. During day time driving in which the headlight switch 19 is open, all the headlamp filaments are normally de-energized. When under these conditions it is desired to temporarily energize the headlamps for signalling purposes, the signal switch 25 is closed thereby energizing the relay coil 27. Energization of the coil 27 will close the armature 30 upon the contacts 32 and 33. The engagement of the armature 30 with the contact 32 energizes the high beam lamp filaments BR-2 by applying the potential of battery 17 thereto through conductor 29, contact 32, armature 30, conductor 34 and conductor 16. At the same time the pilot light 36 is energized from the battery 17 through the relay armature 30 and the contacts 32 and 33 to indicate that the high beam headlamps BR-2 are energized. The headlamp filaments BR-2 will remain energized as long as the signal switch 25 remains closed. It is obvious that the headlamp filaments BR-2 also may be repeated flashed on and off if so desired by repeated operation of the signal switch 25.

When the headlight switch 19 is closed for night time driving, the headlamps are selectively energized from the battery 17 through the dimmer switch 22. With the dimmer switch 22 in its low beam position shown in FIGURE 1, the low beam filaments DM are energized from the battery 17 through the following circuit: conductor 18, headlight switch 19, conductor 20, movable contact 21, contact 23 and conductor 14. Operation of the dimmer switch 22 to move contact 21 into engagement with the contact 24 completes a similar energization circuit through conductor 16 to the high beam filaments BR-2. The high beam filaments BR-1 are also energized through a circuit from dimmer switch contact 24 including conductor 34, relay armature 30, contact 31 and conductor 15 to the filaments BR-1. While the high beam filaments BR-1 and BR-2 are energized, the pilot light 36 is energized from the dimmer switch contact 24 through the resistor 37. The reduction of current flow through the pilot light 36 by the resistor 37 reduces the brilliancy of the pilot light 36 so that it has no objectionable glare under night time conditions.

The signal switch 25 may be operated while the headlight switch 19 is on and the dimmer switch 22 is in either of its positions to signal with the high beam lamps. In the low beam position of the dimmer switch 22 shown in the drawing the closing of the signal switch 25 results in the energization of the high beam lamp filaments BR-2 in exactly the same manner described above in regard to day time operation. The low beam lamp filaments DM, of course, remain energized. If, on the other hand, the dimmer switch 22 is in its high beam position, the energization of the relay coil 27 through the signal switch 25 causes the relay armature to disengage from contact 31 thereby de-energizing the high beam filaments BR-1. At the same time, the other high beam filaments BR-2 remain energized to provide adequate road illumination. It should be noted that in both positions of the dimmer switch the pilot light 36 is energized at full voltage through the relay armature 30 and contact 33 with full brilliance to indicate that the signal switch 25 has been operated.

Referring now to FIGURE 2 of the drawing the components which correspond to those of FIGURE 1 are given the same reference numbers. In this circuit the high beam filaments BR-2 are energized for signalling purposes when the headlight switch 19 is open or when the low beam filaments DM are energized. When the high beam filaments BR-1 and BR-2 are energized through the dimmer switch 22, a signal is given by de-energizing the high beam filaments BR-2.

The circuit of FIGURE 2 differs from that of FIGURE 1 in that the high beam circuit conductor 15 is connected directly to the contact 24 of the dimmer switch 22 while the high beam circuit conductor 16 is connected to circuits controlled by two relays 40 and 41. The relay 40 has an operating coil 42, normally closed contacts 43 and 44 and normally open contacts 45 and 46. The relay 41 includes an operating coil 47 and normally open contacts 48 and 49. The relay coil 42 is connected by the conductor 26 to the signal switch 25 and by the conductor 29 to the battery 17. The relay coil 47 has a resistance considerably greater than that of the high beam lamp filaments BR-1 and is connected to the battery 17 through the following circuit: conductor 29, relay contacts 45 and 46, coil 47, conductor 15 and high beam filaments BR-1. Thus the relay coil 47 is energized upon closing of the relay contacts 45 and 46 providing the lamp filaments BR-1 are not energized through the headlight switch 19 and the dimmer switch 22. The high beam filaments BR-2 are connected to the battery 17 by two independent circuits. One of these circuits extends from battery 17 through conductor 18, headlight switch 19, conductor 20, contacts 21 and 24 of the dimmer switch 22, conductor 15, relay contacts 43 and 44 and conductor 16 to filaments BR-2. The other circuit extends from the battery 17 through conductor 29, relay contacts 45 and 46, relay contacts 48 and 49 and conductor 16 to filaments BR-2.

The operation of the circuit of FIGURE 2 is as follows:

During daytime driving in which the headlight switch 19 is open, the headlight filaments are de-energized. The closing of the switch 25 energizes relay coil 42 which opens contacts 43 and 44 and closes contacts 45 and 46. The closing of contacts 45 and 46 energizes the pilot light 36 and also energizes the relay coil 47 which is connected to ground through the filaments BR-1. The energization of relay coil 47 closes the contacts 48 and 49 to complete an energization circuit to the lamp filaments BR-2 through the conductor 16, relay contacts 48 and 49, relay contacts 45 and 46 and conductor 29. The filaments BR-2 will remain energized as long as the signal switch 25 remains closed.

The high beam filaments BR-2 are energized in the same manner described above when the signal switch 25 is closed while the headlight switch 19 is closed and the dimmer switch 22 is in the low beam position as shown in FIGURE 2 of the drawing. It will be apparent that the low beam filaments DM remain energized while the filaments BR-2 are energized. In the event the dimmer switch 22 is in its high beam position with the movable contact 21 engaging the contact 24, the energization of relay coil 42 upon the closing of the signal switch 25 will cause the opening of the relay contacts 43 and 44 and the closing of the relay contacts 45 and 46. The closing of the latter contacts, however, will not energize relay coil 47 as both ends of the coil 47 are at the same potential. Thus the opening of the relay contacts 43 and 44 de-energizes the high beam lamp filaments BR-2 while the high beam lamp filaments BR-1 remain energized through a circuit including the dimmer switch 24 and the headlight switch 19.

As in the embodiment of FIGURE 1, the pilot light 36 is energized with full voltage and operates with full brilliance whenever the signal switch 25 is closed. During normal operation of the high beam lamp filaments BR-1 and BR-2 the parallel circuit consisting of resistor 37 and relay coil 47 is connected in series to effect the desired reduction in brilliance of the pilot light 36. Thus the pilot light 36 is energized at two different levels of brilliancy depending upon whether it is used to indicate normal high beam operation or to indicate signal operation of the high beam filaments.

From the above description it will be seen that this invention provides a simple and inexpensive signal system useful both day and night with conventional vehicle lighting systems of either the manually or automatically operated type. The invention provides optical signals of greater safety for night time driving than the prior use of the high and low beam lamps for signalling purposes.

What is claimed is:

1. An automotive vehicle light and signal system comprising, in combination:
   (a) an electric power source;
   (b) headlights having low beam filaments connected in a low beam circuit, first high beam filaments connected in a first high beam circuit and second high beam filaments connected in a second high beam circuit;
   (c) a headlight control switch having a battery terminal connected to said source and having a headlamp terminal, said headlight control switch having an "on" position and an "off" position;
   (d) a two position dimmer switch having a low beam headlamp terminal, a high beam headlamp terminal and a common contact connected to the headlamp terminal of said headlight control switch, said dimmer switch selectively connecting said high beam and low beam headlamp terminals of said common contact;
   (e) a first conductor connecting said low beam circuit to the low beam headlamp terminal of said dimmer switch;
   (f) a second conductor connecting said first high beam circuit to the high beam headlamp terminal of said dimmer switch;
   (g) signal switching means operable by a vehicle operator including a first normally closed contact means connecting said second high beam circuit to the high beam headlamp terminal of said dimmer switch and a second normally open contact means directly connecting one of said high beam circuits to said power source, said signal switch means being operable independently of said headlight control switch and said dimmer switch.

2. An automotive vehicle light and signal system comprising, in combination:
   (a) an electric power source;
   (b) headlights having low beam filaments connected in a low beam circuit, first high beam filaments connected in a first high beam circuit and second high beam filaments connected in a second high beam circuit;
   (c) a headlight control switch having a battery terminal connected to said source and having a headlamp terminal, said headlight control switch having an "on" position and an "off" position;
   (d) a two position dimmer switch having a low beam headlamp terminal, a high beam headlamp terminal and a common contact connected to the headlamp terminal of said headlight control switch, said dimmer switch selectively connecting either of said high beam and low beam headlamp terminals to said common contact;
   (e) a first conductor connecting said low beam circuit to the low beam headlamp terminal of said dimmer switch;
   (f) a second conductor connecting said first high beam circuit to the high beam headlamp terminal of said dimmer switch;
   (g) first circuit means including normally closed contacts connecting said second high beam circuit to the high beam headlamp terminal of said dimmer switch;
   (h) second circuit means including normally open contacts directly connecting said first high beam circuit to said power source;
   (i) relay means which, when energized, will open said normally closed contacts and will close said normally open contacts;
   (j) and third circuit means including a normally open signal switch connecting said relay means to said power source and operable by a vehicle operator to energize said relay means.

3. An automotive vehicle light and signal system according to claim 2 including a lamp indicator circuit connected to said first high beam circuit in parallel with said first high beam filaments, said lamp indicator circuit comprising:
   (a) a dimming resistor and a pilot light connected in series;
   (b) an additional normally open contacts connected in parallel with said resistor and closed by said relay means when the latter is energized to short out said resistor.

4. An automotive vehicle light and signal system comprising, in combination:
   (a) an electric power source;
   (b) headlights having low beam filaments connected in a low beam circuit, first high beam filaments connected in a first high beam circuit and second high beam filaments connected in a second high beam circuit;
   (c) a headlight control switch having a battery terminal connected to said source and having a headlamp terminal, said headlight control switch having an "on" position and an "off" position;
   (d) a two position dimmer switch having a low beam headlamp terminal, a high beam headlamp terminal and a common contact connected to the headlamp terminal of said headlight control switch, said dimmer switch selectively connecting either of said high beam and low beam headlamp terminals to said common contact;
   (e) a first conductor connecting said low beam circuit to the low beam headlamp terminal of said dimmer switch;
   (f) a second conductor connecting said first high beam circuit to the high beam headlamp terminal of said dimmer switch;
   (g) first circuit means including normally closed contacts connecting said second high beam circuit to the high beam headlamp terminal of said dimmer switch;
   (h) second circuit means including first normally open contacts and second normally open contacts connected in series and directly connecting said second high beam circuit to said source;
   (i) first relay means which, when energized, will open said normally closed contacts and will close said first normally open contacts;

(j) third circuit means including a normally open signal switch connecting said relay means to said power source and operable by a vehicle operator to energize said first relay means;

(k) second relay means which, when energized, will close said second normally open contacts;

(l) and fourth circuit means connecting said second relay means between the high beam headlamp terminal of said dimmer switch and the junction of said first normally open contacts and said second normally open contacts.

5. An automotive vehicle light and signal system according to claim 4 including a lamp indicator circuit connected to said first high beam circuit in parallel with said first high beam filaments, said lamp indicator circuit comprising:

(a) a dimming resistor and a pilot light connected in series;

(b) and fifth circuit means connecting the junction of said dimming resistor and said pilot light to said junction of said first normally open contacts and said second normally open contacts.

No references cited.

JAMES W. LAWRENCE, *Primary Examiner.*

P. C. DEMEO, *Assistant Examiner.*